United States Patent [19]
Butler

[11] 4,099,340
[45] Jul. 11, 1978

[54] CHAOTIC MOTION GENERATOR

[76] Inventor: Crispin O. Butler, 106 Kendall Blvd., Oaklyn, N.J. 08107

[21] Appl. No.: 804,585

[22] Filed: Jun. 8, 1977

[51] Int. Cl.² .......................................... G09B 23/06
[52] U.S. Cl. .............................. 35/19 R; 35/18 R; 273/144 A; 40/430
[58] Field of Search .............. 35/18 R, 19 R, 19 A; 40/106.51; 273/144 R, 144 A, 144 B

[56] References Cited
U.S. PATENT DOCUMENTS

| | | | |
|---|---|---|---|
| 874,110 | 12/1907 | Packard | 35/19 R X |
| 3,253,353 | 5/1966 | Steed et al. | 35/19 R |
| 3,271,881 | 9/1966 | Wagnon | 35/19 R |
| 3,553,856 | 12/1968 | Hageseth | 35/19 R |

*Primary Examiner*—Harland S. Skogquist
*Attorney, Agent, or Firm*—Duffield and Lehrer

[57] ABSTRACT

A plurality of elongated rollers are arranged on a surface in a substantially closed polygonal configuration. The rollers are interconnected so as to be simultaneously driven by a single motor coupled to one of the rollers. A plurality of resilient members randomly project from the surface of the rollers and are adapted to contact a plurality of different size spheres located within the perimeter of the polygon. Contact between the projections and the spheres when the cylinders are rotated provide impetus to the spheres to cause them to move across the surface in a random fashion. Collisions between the various spheres further randomizes their motion.

10 Claims, 3 Drawing Figures

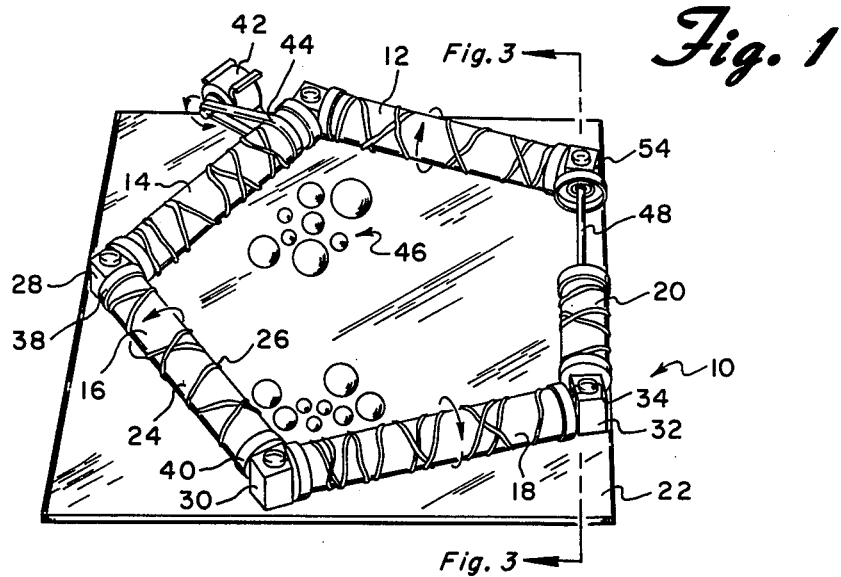
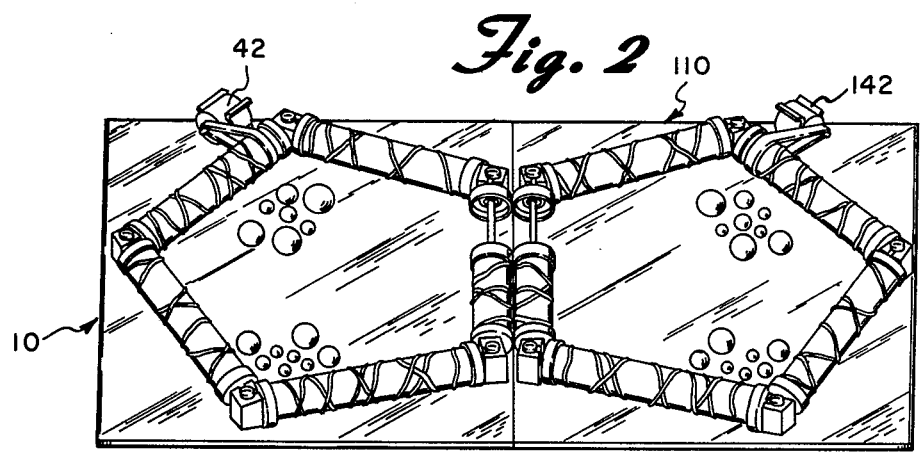
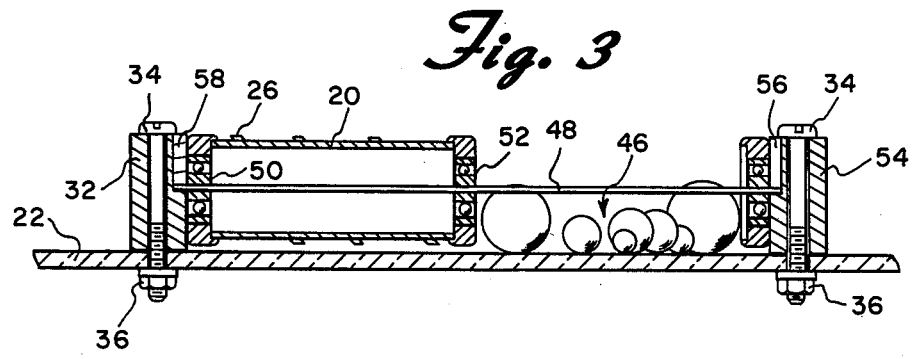

CHAOTIC MOTION GENERATOR

BACKGROUND OF THE INVENTION

The present invention is directed toward a chaotic motion generator and more particularly toward a chaotic motion generator which is useful as a teaching aid particularly in the areas of physics and physical chemistry.

Chaotic motion of easily visible objects has long been recognized as a useful model for a wide variety of molecular phenomena. For example, phase changes, diffusion and laws relating temperature, pressure and density of a sample of gas are commonly introduced side by side with their large scale analogs. Also statistical concepts such as binomial, Poisson and Maxwell distributions, average collision frequency and mean free path are commonly developed with the aid of apparatus that produce visible chaotic motion. Depending on the adequacy of the apparatus and the academic level of the students, the physical model may be viewed quantitatively or strictly qualitatively.

Various devices ranging from an aquarium partially filled with Styrofoam spheres that is agitated by hand to an air table equipped with a vibrating perimeter have been used to illustrate chaotic motion. U.S. Pat. No. 3,271,881 also proposes a device for allegedly demonstrating random molecular motion. This device is comprised of a clear transparent housing filled with a plurality of spheres and placed on top of a Van de Graaff static electricity generator.

These prior art devices have not, however, been totally satisfactory. The motion generated within the devices has not always been random but has normally included numerous observable oscillations. In addition, the speed of the various particles could not always be easily adjusted or, if adjustable, was only adjustable over a very limited range. Even further, particularly with the devices shown in U.S. Pat. No. 3,271,881, the particles often move too rapidly to permit many quantitative experiments. These prior devices suffered from numerous other problems and deficiencies making them only partially acceptable as teaching aids.

SUMMARY OF THE INVENTION

The present invention overcomes all of the above stated and other problems of the known prior art devices and provides a chaotic motion generator which is particularly useful as a teaching aid. This is accomplished by a plurality of elongated rollers being arranged on a surface in a substantially closed polygonal configuration. The rollers are interconnected so as to be simultaneously driven by a single motor coupled to one of the rollers. A plurality of resilient members randomly project from the surface of the rollers and are adapted to contact a plurality of different size spheres located within the perimeter of the polygon. Contact between the projections and the spheres when the cylinders are rotated provide the impetus to the spheres to cause them to move across the surface in a random fashion. Collisions between the various spheres further randomizes their motion. Preferably, the surface is made of a rigid transparent material such as Plexiglas or the like so that the entire device may be placed on the surface of an overhear projector. In this way, the motion of the particles can be displayed on a screen.

BRIEF DESCRIPTION OF THE DRAWINGS

For the purpose of illustrating the invention, there are shown in the accompanying drawing forms which are presently preferred; it being understood that the invention is not intended to be limited to the precise arrangements and instrumentalities shown.

FIG. 1 is a perspective view of a chaotic motion generator constructed in accordance with the principles of the present invention;

FIG. 2 is a view similar to FIG. 1 showing two such devices side by side in cooperation with each other, and FIG. 3 is a cross-sectional view taken along the line 3—3 of FIG. 1.

DETAILED DESCRIPTION OF THE PREFERRED EMBODIMENT

Referring now to the drawing in detail wherein like reference numerals have been used throughout the various figures to designate similar elements, there is shown in FIG. 1 a perspective view of a chaotic motion generator constructed in accordance with the principles of the present invention and shown generally as 10.

Chaotic motion generator 10 is comprised of five rollers 12, 14, 16, 18 and 20 arranged in a substantially pentagonal configuration on a substantially flat and smooth rigid surface 22. Preferably, the surface 22 is made of a transparent material such as an acrylic plastic or the like, so that the entire chaotic motion generator 10 may be placed on the projecting surface of an overhead projector for displaying the area within the pentagon on a screen.

As shown in FIG. 1, each of the rollers 12, 14, 16 and 18 are substantially identical. Each roller, such as roller 16, for example, includes a cylindrical surface 24 having a plurality of resilient members 26 extending outwardly therefrom. Resilient members 26 may be a plurality of randomly placed rubber bands or the like, as shown, or they may be small stud-like projections extending from the surface 24. The resilient members are preferably not only randomly spaced along the length of the roller but also project various random distances therefrom.

Each of the rollers is rotated on an elongated axle which passes through the length of the roller. Preferably, ballbearings, or similar known devices, are used to mount the rollers on the axle. The axle is held in place in a known manner by bearing blocks such as blocks 28, 30 or 32. The bearing blocks are in turn mounted on the surface 22 via bolts and nuts such as shown at 34 and 36 in FIG. 3.

Each roller also includes a rubber collar such as shown at 38 and 40 at each end thereof. Collars 38 and 40 extend from the surface of the roller and are adapted to cooperate with similar collars on adjacent rollers so that rotary motion of one roller is transferred to the adjacent roller. In this way, each of the rollers 12 to 20 are adapted to move in unison. Beveled gears or universal joints or similar devices could, of course, be used in place of the rubber collars to transmit rotary motion from one roller to the next.

A small variable speed electric motor 42 is mounted on the surface 22 adjacent roller 14 and on the outside of the perimeter of the pentagon. Preferably, motor 42 is mounted to the surface 22 using resilient mounts or the like (not shown) to avoid vibrations of the motor from being transferred to the surface. Motion is transferred from the motor 42 to roller 14 through a resilient drive belt 44 which passes around the roller 14. Motor 42 rotates in a counterclockwise direction (as viewed in FIG. 1). As a result, roller 14 and the remaining rollers which rotate in unison therewith rotate in a sense such that the surface of each roller adjacent the inner side of the pentagon moves upwardly away from the surface 22.

Located within the area surrounded by the rollers are a plurality of spheres 46. Spheres 46 may have substantially any diameter but it is preferable that they be less than the diameter of the rollers. In addition, the diameter of the spheres must be greater than the space between the bottom of the rollers and the surface 22 so that they cannot pass therebetween. Preferably, a plurality of spheres of varying diameters and/or of varying masses are provided. The various and relative sizes of the spheres 46 are perhaps best shown in FIG. 3.

All of the rollers 12 to 20 may be identical to each other and may be constructed as described above as with respect to roller 16. Alternatively, it is possible to construct one of the rollers such that it extends only partially across one of the sides of the pentagon. Roller 20 is an example of one such roller.

With reference to FIG. 3, it can be seen that roller 20 is rotatably mounted on an axle 48 by way of ball bearings 50 and 52 located at the ends of the roller. The axle 48 is, in turn, journaled into bearing blocks 32 and 54. Preferably, the bearing blocks 32 and 54 are constructed so that axle 48 can be easily removed therefrom. To this end, a vertically extending channel such as channel 56 is provided in each of the blocks 32 and 54 on the surface from which the axle 48 extends. With the axle in place, as shown in FIG. 3, a block 58 may be reinserted into the channel 56 over the axle to prevent the same from becoming displaced.

Roller 20 is substantially identical to rollers 12 to 18 except that it is somewhat shorter than the other rollers. As a result, it extends only part way between the bearing block 32 and bearing block 54 thereby leaving a space or window on the one side of the pentagon. However, in view of the fact that the axle 48 extends entirely from the block 32 to the block 54, the window is not entirely open since the axle 48 functions as a partial barrier. As shown in FIG. 3, some of the spheres 46 are small enough to fit through the space between the axle 48 and the surface 22 and others of the spheres are too large to fit through this space.

As a result of the channels 56 in the blocks 32 and 54, it can be seen that the roller 20 and the axle 48 can be easily removed when desired. The side of the pentagon intended to be occupied by this roller could be left entirely open or other rollers occupying the entire side of the pentagon or any part thereof could be used in place of roller 20.

FIG. 2 shows an embodiment of the invention wherein two chaotic motion generators are placed next to each other with their windows directly opposite. Preferably, there is no mechanical interconnection between the two generators. In other words, the rollers of generator 10 move totally independently of the rollers of the generator 110. In this way, the speed of the rollers of generator 10 determined by the speed of the motor 42 and the speed of the rollers of generator 110 determined by the speed of the motor 142 may be varied with respect to the other. In all respects, generator 110 is preferably identical to generator 10. While the two generators 10 and 110 are shown to be substantially in the same plane with a substantially flat continuous surface between the two, it is also possible to place a small hill between the windows. In addition, it is possible to place the two generators at different vertical levels with a ramp between them. Other modifications are, of course, also possible.

The chaotic motion generator of the present invention may be used to demonstrate various phenomena. Most simply, the device can be used merely to show the random chaotic motion of the molecules of a gas. This is accomplished by replacing the partial roller 20 with a full roller and placing a plurality of spheres 46 on the surface 22 in the space surrounded by the rollers. With the motor 42 turned on, the spheres will be driven by the rollers in random fashion. Collisions between the spheres will, of course, further randomize the motion.

By way of example and not limitation, the device may also be used in the following ways. A chaotic motion generator 10 as shown in FIG. 1 equipped with a window is located about 20 cm above a horizontal surface. Carbon paper over paper is placed directly below the window so that the spheres 46 leaving the device will land and bounce on the paper. It is leveled and the motor 42 is adjusted to the desired speed. The window is blocked as ten spheres are placed in the chaotic motion generator. When the spheres have had time to come to equilibrium with the rollers, the window is unblocked and five of the ten spheres are allowed to roll out of the device and leave marks on the paper. The window is blocked, the 5 spheres are replaced and a new sheet of paper is placed under the carbon paper. The cycle is repeated as many times as desired. Individual velocity vectors can be reconstructed by using the bounce marks as well as the mark caused by the initial impact and by correcting for the spheres that receive a horizontal impulse as they roll off the edge. The length of these vectors can be histogramed to obtain the speed distribution. If the effusion times for the groups of five spheres are measured and averaged, good agreement can be seen between the average speed determined from the histogram and the average speed calculated.

Equilibrium between states separated by an energy barrier or activation energy can be demonstrated by connecting two chaotic motion generators with a surface that contains hills or valleys. One roller is removed from each device to allow the passage of spheres from one to the other. The relative average populations of the upper and lower devices can be readily determined experimentally for various differences in height of the two devices. A connecting surface in the form of a hill cut by a diagonal valley is partially interesting. It represents a two dimentional reaction surface containing an activated complex that has a geometric form factor.

To simulate a semi-permeable membrane, a pair of devices each with a window are joined so that small spheres can pass from one to the other but larger spheres cannot (they run into the axles of the rollers 20). By controlling the speed of each device separately, the smaller spheres can be shifted from one device to the other while the larger spheres are confined to one side. Thus concepts such as partial pressure, osmotic pressure and heat transfer are easily illustrated.

The pair of devices shown in FIG. 2 may also be tilted so that phase changes and vapor pressure may be demonstrated qualitatively. A demonstration of cooling under adiabatic conditions is very dramatic. Initially the spheres are separated by size and the window between the devices is blocked. When the rollers of both devices have set the spheres in motion the block is removed. As the small spheres leak through the window they are usually slowed when they collide with the larger spheres, as the large spheres are usually moving away from the window. This permits more small spheres to enter so that a maximum population of spheres occurs soon after the block is removed. As spheres encounter the rollers and pick up kinetic energy an equilibrium population is established. Using ten spheres in each side initially will typically result in a maximum population of twenty and an equilibrium population of sixteen. However, variation is expected.

As stated above, the entire device or a combination of two devices can be placed on the projecting surface of an overhead projector so that the motion of the spheres can be viewed on a screen. In addition, it is possible to place a chaotic motion generator 10 on substantially any surface to show motion of the spheres or other particles across the surface. This is accomplished by simply inverting the generator 10 and placing it on the desired surface. As shown best in FIG. 3, the head of screw 34 extends above the surface of the rollers substantially the same distance as the space between the bottom of the rollers and the surface 22. Thus, with the generator 10 inverted and placed on a surface, the rollers will be spaced from the surface by the same amount as they are spaced from the surface 22. With the generator 10 inverted, the same can be placed on an air table or the like and the spheres may be replaced by discs.

While the chaotic motion generator of the present invention has been illustrated using five rollers in a pentagon configuration, it should be readily apparent that substantially any number of rollers or configurations would be employed. It is preferred, however, that an odd number of rollers be selected. This increases the randomness of the motion produced and reduces any preferred directions of travel of the spheres.

The present invention may be embodied in other specific forms without departing from the spirit or essential attributes thereof and, accordingly, reference should be made to the appended claims, rather than to the foregoing specification as indicating the scope of the invention.

I claim:

1. A chaotic motion generator comprising a substantially horizontal surface, elongated roller means mounted on said surface so as to be spaced therefrom, said roller means lying in a substantially horizontal plane substantially parallel to said surface and defining a substantially closed loop, and means for rotating said roller means.

2. A chaotic motion generator as claimed in claim 1 wherein said roller means includes a plurality of projections extending from the surface thereof.

3. A chaotic motion generator as claimed in claim 1 wherein said roller means is comprised of a plurality of elongated substantially cylindrically shaped rollers arranged in a substantially closed polygon configuration.

4. A chaotic motion generator as claimed in claim 3 wherein said polygon has an odd number of sides.

5. A chaotic motion generator as claimed in claim 3 wherein all but one of said rollers are substantially equal in length and wherein said polygon is a substantially equilateral polygon, said one roller extending only part way across one side of said polygon.

6. A chaotic motion generator as claimed in claim 5 wherein said one roller is mounted on an axle having a diameter substantially smaller than the diameter of said roller, said axle extending the entire length of said side of said polygon.

7. A chaotic motion generator as claimed in claim 6 wherein each of said rollers is mounted on an axle and further including mounting blocks extending upwardly from said surface at the corners of said polygon, said mounting blocks supporting the ends of said axles of said rollers.

8. A chaotic motion generator as claimed in claim 1 wherein said rotating means rotates said roller means in a direction such that the surface of said roller means adjacent the area within said loop moves in a direction away from said substantially horizontal surface.

9. A chaotic motion generator as claimed in claim 1 including a plurality of spheres resting on said surface within the area surrounded by said loop.

10. A chaotic motion generator as claimed in claim 9 wherein some of said spheres are larger than others of said spheres, the diameter of the larger of said spheres being less than the diameter of said roller means and the diameter of the smaller of said spheres being greater than said space between said roller means and said substantially horizontal surface.

* * * * *